Nov. 18, 1958  F. M. WILLBRANDT  2,860,847
CARTON FILLING AND WEIGHING MACHINE
Filed Feb. 8, 1954  4 Sheets-Sheet 1

INVENTOR.
Franklin M. Willbrandt
BY
Otto A. Earl
Attorney.

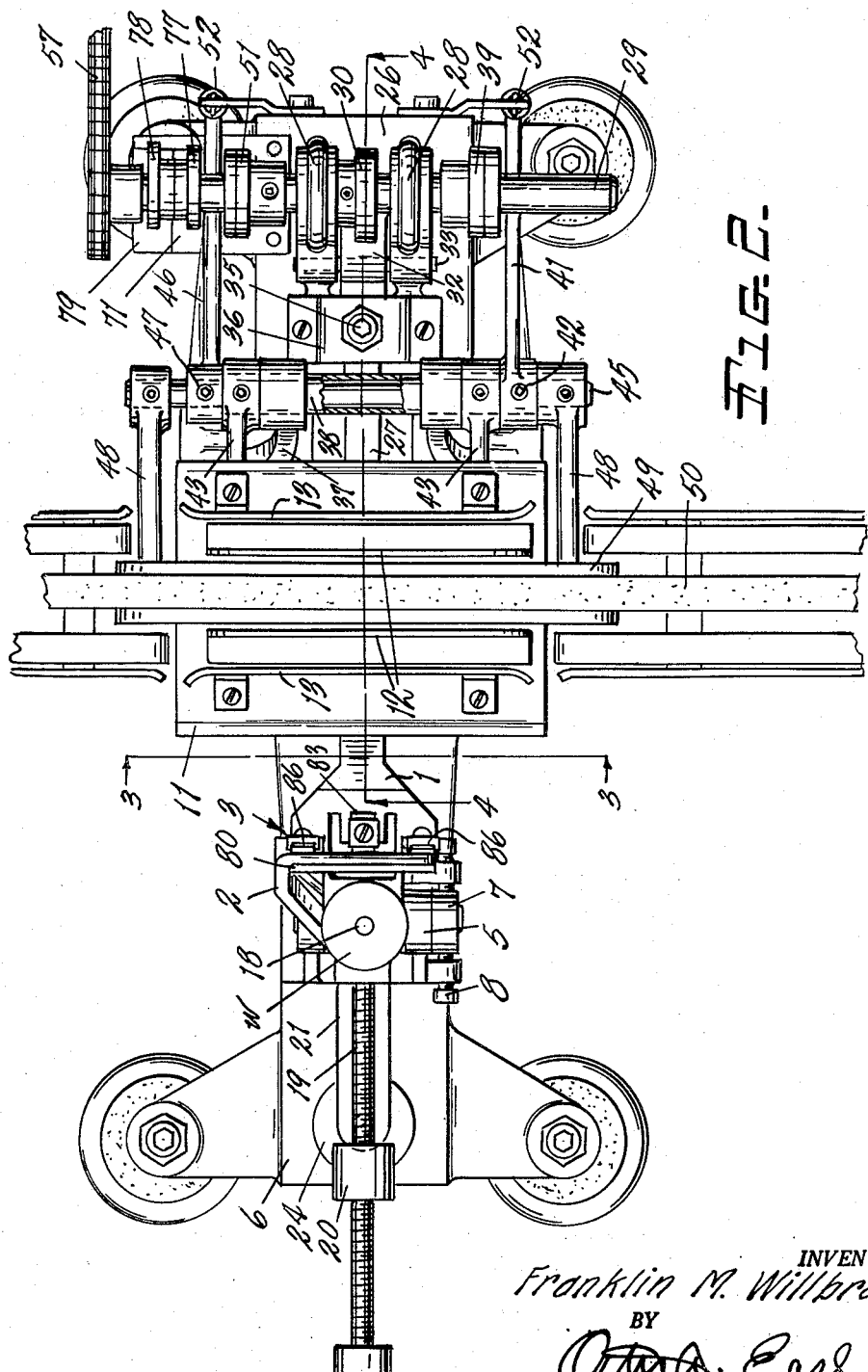

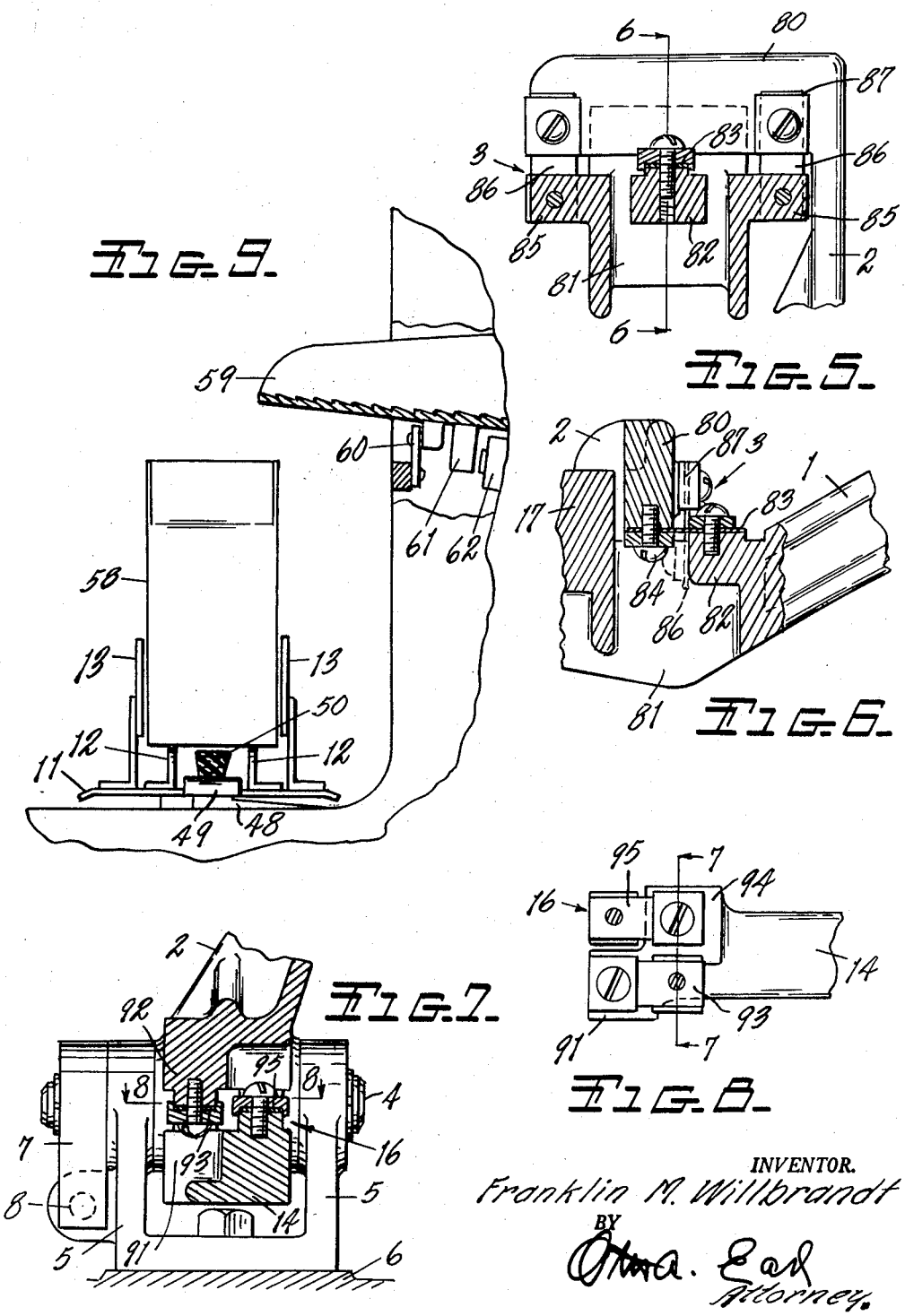

Nov. 18, 1958   F. M. WILLBRANDT   2,860,847
CARTON FILLING AND WEIGHING MACHINE
Filed Feb. 8, 1954   4 Sheets-Sheet 4
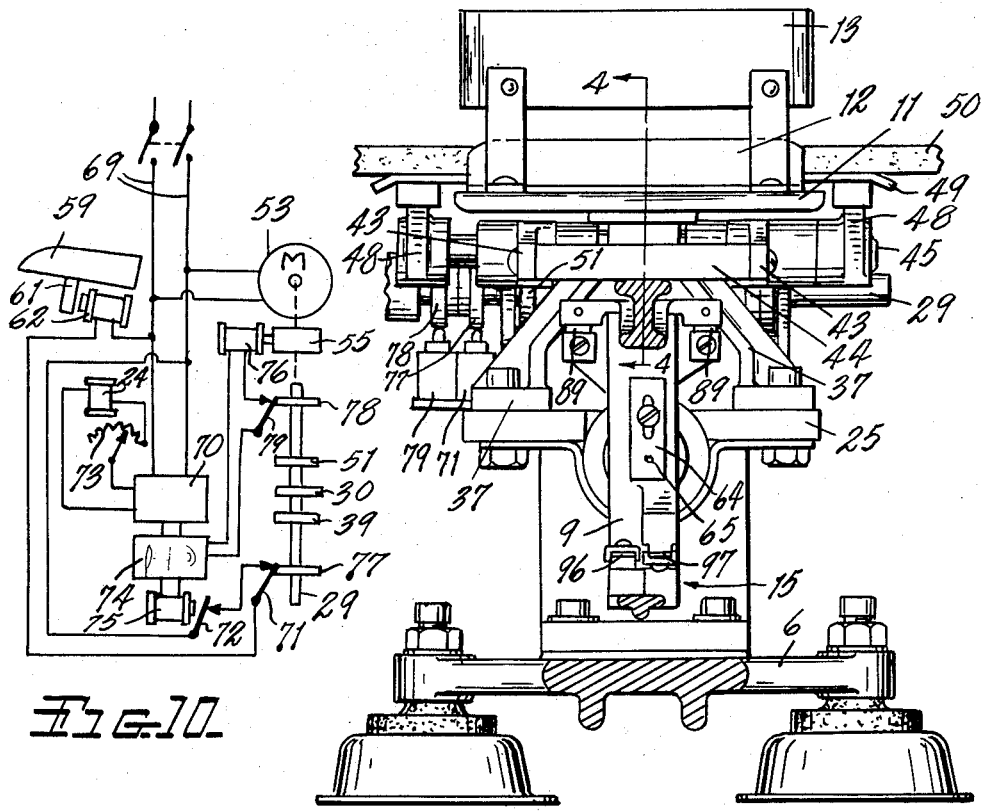
Fig. 10.
Fig. 3.
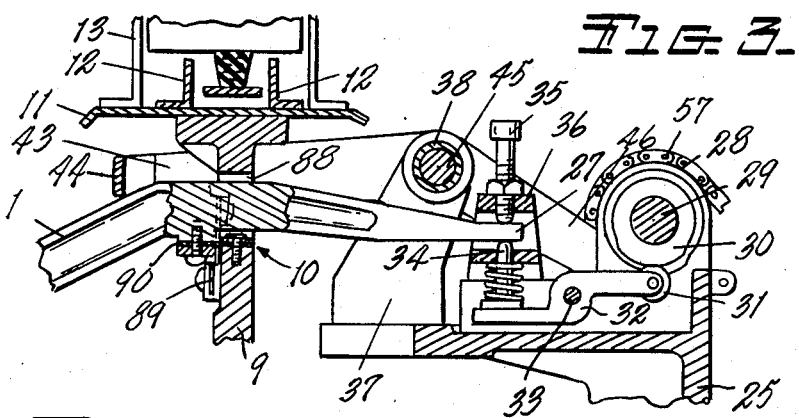
Fig. 4.
INVENTOR.
Franklin M. Willbrandt
BY
Otto A. Earl
Attorney.

United States Patent Office 2,860,847
Patented Nov. 18, 1958

2,860,847

CARTON FILLING AND WEIGHING MACHINE

Franklin M. Willbrandt, Battle Creek, Mich., assignor to Battle Creek Packaging Machines, Inc., a corporation of Michigan Application February 8, 1954, Serial No. 408,772

3 Claims. (Cl. 249—59)

This invention relates to improvements in carton filling and weighing machine.

The principal objects of this invention are:

First, to provide a novel form of weighing machine for rapidly filling a container to a predetermined weight and advancing the full container to make room for an empty container.

Second, to provide a weighing machine having a scale which is extremely accurate and which requires a minimum movement of the scale pan to move the scale between underweight and full weight positions.

Third, to provide a scale for a weighing machine having a sensitive balance beam that is swingably supported without the use of pivots or springs which may become clogged or changed in characteristics to destroy the accuracy of the scale.

Fourth, to provide a novel form of counterbalance scale in which the scale beam is supported by flexible elements positioned in neutral positions in the balanced condition of the scale.

Fifth, to provide a novel form of scale having a counterbalanced scale beam connected to a series of parallelogram forming elements arranged to direct the movement of the pan in straight vertical motion.

Sixth, to provide a weighing machine having a freely swingably supported scale beam and an adjustable electromagnet associated with the beam to vary the counterbalance force of the beam.

Seventh, to provide a weighing machine that is relatively simple to manufacture and adjust and which is not apt to get out of adjustment during use.

Other objects and advantages of the invention will be apparent from a consideration of the following description and claims. The drawings, of which there are four sheets, illustrate a highly practical form of the weighing machine.

Fig. 2 is a fragmentary plan view of the structure shown in Fig. 1 with portions broken away in horizontal cross-section.

Fig. 3 is a fragmentary vertical cross-sectional view taken along the plane of the line 3—3 in Fig. 2.

Fig. 4 is a fragmentary vertical cross-sectional view taken longitudinally through the scale beam along the plane of the line 4—4 in Figs. 2 and 3 and illustrating the scale in raised carton ejecting position.

Fig. 5 is an enlarged fragmentary vertical cross-sectional view taken along the plane of the line 5—5 in Fig. 1 and illustrating the primary supporting connection to the scale beam.

Fig. 6 is an enlarged fragmentary vertical cross-sectional view taken along the plane of the line 6—6 in Fig. 5.

Fig. 7 is an enlarged fragmentary vertical cross-sectional view taken along the plane of the line 7—7 in Figs. 1 and 8 and illustrating the supporting connection to the auxiliary or parallel beam of the scale.

Fig. 8 is an enlarged fragmentary plan view of the connection shown in Fig. 7.

Fig. 9 is a fragmentary side elevational view of the upper portion of the weighing machine illustrating the carton filling apparatus partially in vertical cross-section.

Fig. 10 is a schematic diagram of the electrical connections of the machine.

Figure 1:
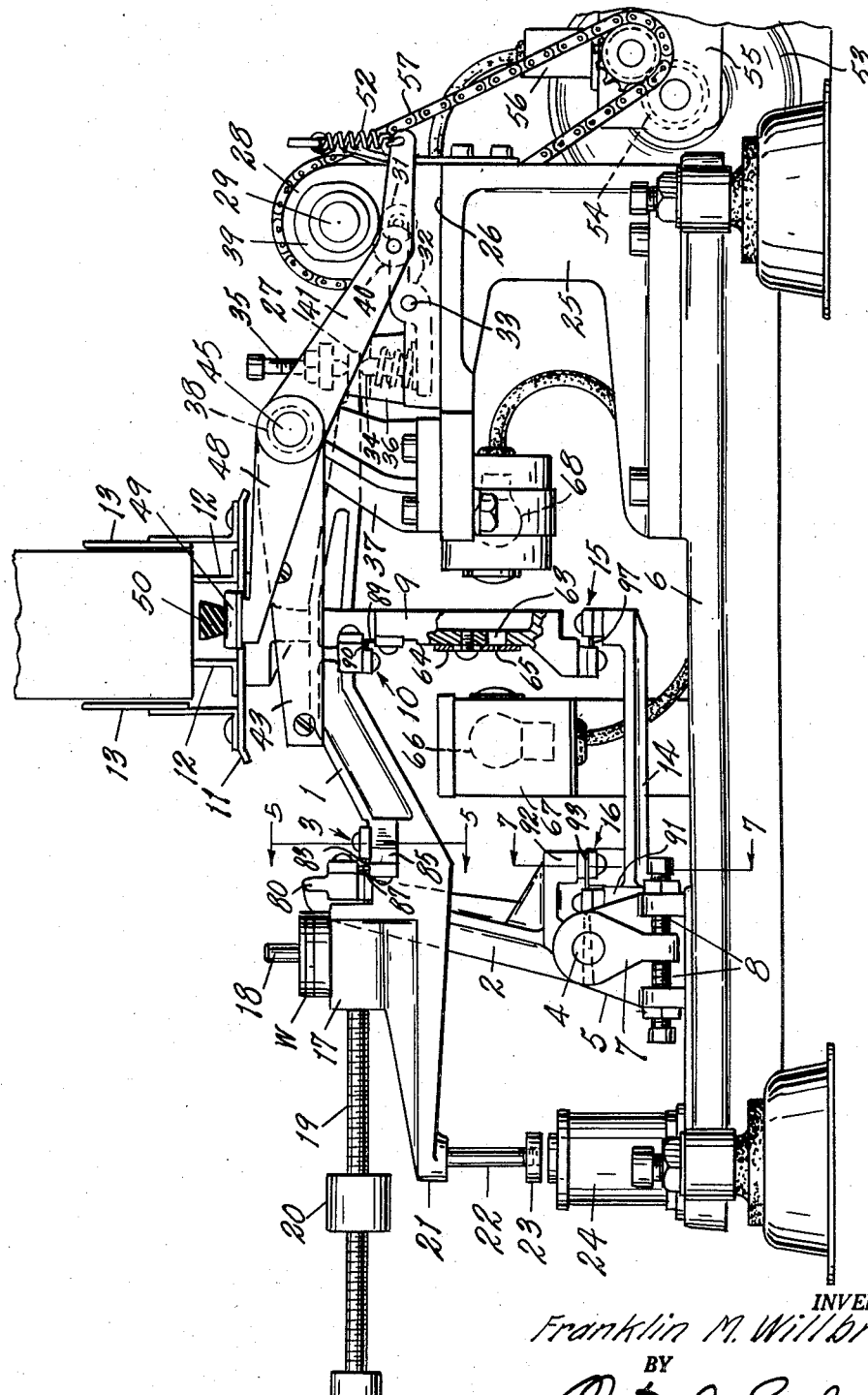
Fig. 1 is a side elevational view of the weighing machine illustrating the scale in raised locked position prior to filling and weighing of a carton on the scale pan.

The weighing machine which is the subject of the present invention is an improvement on the weighing machine disclosed in my Patent No. 2,595,035 issued April 29, 1952, for a Carton Filling and Weighing Machine, and the present machine may incorporate or use certain features of the prior machine as will be pointed out in the description of the present machine.

The present weighing machine is designed to rapidly fill cartons or containers with any desired granular or flowing material and to automatically weigh the carton and shut off the flow of material thereto when the carton reaches a predetermined weight. The machine further includes control apparatus which functions to eject the filled carton and introduces an unfilled carton to the scale in a rapid and automatically controlled manner. The scale which determines the weight of the containers consists generally of a main or primary scale beam 1 which is movably supported on an upright 2 by means of a flexible connection indicated generally at 3. The details of the connection 3 are illustrated more completely in Figs. 5 and 6 and will be discussed in greater detail presently. The upright 2 is fixedly connected to a pivot 4 and the pivot is supported in a yoke 5 mounted on a base 6. The upright 2 and pivot 4 are swingably adjustable by an ear 7 on the end of the pivot that projects between and is adapted to be adjusted and clamped by the screws 8.

The inner or carton supporting end of the scale beam 1 is connected to a vertical column 9 by means of a swingable connection generally indicated at 10. Details of the connection 10 will be discussed in greater detail presently. The upper end of the column 9 extends above the beam and supports a scale pan 11 having carton supporting rails 12 on its upper surface. Carton retaining guards 13 are also provided on the sides of the scale pan.

The column 9 is restrained or guided in true vertical motion by a lower parallel beam 14 connected to the bottom of the column by a yieldable connection indicated generally at 15. The opposite end of the parallel beam 14 is swingably connected to the bottom of the upright 2 by a swingable connection indicated generally at 16 and shown in greater detail in Figs. 7 and 8.

The outer or counterbalance end of the scale beam 1 is provided with a platform 17 and upstanding pin 18 for the reception of counterbalance weights W. A horizontally projecting screw 19 secured to the platform carries a threaded weight 20 for fine adjustment of the counterbalance weight. The outer end of the beam 1 is extended as at 21 approximately the same distance on the opposite side of the supporting connection 3 as the connection 10 to the scale pan column. A brass or other non-magnetic pin 22 extends downwardly from the end 21 and carries an iron washer 23 on its lower end. The washer 23 is thus supported by the scale beam in closely spaced relation above an adjustable electromagnet 24. The electromagnet 24 is supported on the base 6 and is connected to be energized in a manner which will be described presently.

The inner end of the base 6 carries a pedestal 25 having an upper surface 26 extending outwardly below the extreme inner end 27 of the scale beam. The pedestal 25 carries bearings 28 for a cam shaft 29 and the cam shaft is provided with a first control cam 30 (see Figs. 2 and 4) that acts upon a follower 31 carried by a lever 32. The lever 32 is pivotally supported at 33 and its outer end carries an upstanding pin 34 which is thus adapted to swing upwardly underneath the inner end 27 of the scale beam and raise the scale beam and pan 11 into upwardly locked position against a stop screw 35. The screw 35 is carried by a yoke 36 bridging the end of the scale beam 1.

A bracket 37 secured to the top of the pedestal 25 supports a tubular rock shaft 38 parallel to the cam shaft 29. A second cam 39 on the cam shaft coacts with a follower 40 carried by the lever 41 which is secured to the end of the tubular rock shaft by the set screw 42. (See Fig. 2.)

The tubular rock shaft carries forwardly projecting arms 43 which underlie the scale pan 11 and are connected at their outer ends by a cross-bar 44. The second cam 39 and arms 43 operate to move upwardly underneath the pan 11 to stabilize the pan during entrance of cartons to the pan. The arms 43 and pin 34 have a partially duplicate function in that they each lock the scale beam and pan in raised position.

Rotatably mounted within the tubular rock shaft 38 is a shaft 45 having a crank arm or lever 46 secured to one end by the set screw 47. The end of the shaft 45 carries forwardly projecting arms 48 which are connected at their outer ends to a conveyor belt support shoe 49. The shoe 49 overlies and bridges the scale pan 11 and functions to support a conveyor belt 50 between the carton supporting rails 12 on the scale pan. Actuation of the shoe 49 by the crank arm 46 will thus function to raise the conveyor belt above the level of the rails 12 and cause a filled carton to be carried off the scale pan. The crank arm 46 extends underneath the cam shaft 29 and is provided with a follower that coacts with a third cam 51 on the cam shaft. Springs 52 maintain the crank arms 41 and 46 in raised position except when depressed by their respective actuating cams 39 and 51.

The cam shaft 29 is connected to be rotated in a one revolution cycle by a motor 53. The motor drives through a suitable reduction gear indicated generally at 54 to a one revolution clutch indicated generally at 55. The clutch 55 is arranged to be tripped or engaged by a solenoid 56 and a chain 57 connects the one revolution clutch to the cam shaft 29.

A variety of feeding or material handling structures may be used to introduce material into a container supported upon the scale pan as at 58. As is illustrated in Fig. 9 it is now preferred to utilize a vibratory feeding apparatus 59 for this purpose. The feeding apparatus is well known and includes a feeding chute or hopper spring supported on upright leaf springs 60. An ear or lug 61 depends below the chute into the magnetic field of a solenoid 62 so that when alternating current is delivered to the solenoid the lug and chute are alternately and rapidly attracted to and repelled from the solenoid. This causes the material being fed to travel over the lip of the chute into the container 58 and the delivery of material is conveniently stopped without overflow by simply de-energizing the solenoid 62.

In order to control and adjust operation of the scale and filling mechanism in response to movement of the scale beam 1 the column 9 is apertured as at 63 (see Fig. 1) and the aperture is selectively and adjustably covered by a shutter plate 64 having a small aperture 65 therethrough. A photoelectric cell 66 is supported in a suitable housing 67 in front of the aperture 65 and an electric lamp 68 is supported on the underside of the pedestal 25 behind the column 9 to direct a beam of light through the aperture 65 to the photoelectric cell 66. The shutter plate 64 and the electric bias of the photoelectric cell can be adjusted to cause the photoelectric cell to respond to very minute movements of the column 9 and the aperture 65. Movements of the order of $\frac{1}{32}$ of an inch are contemplated in the described structure.

The operation of the scale and the weighing machine are co-ordinated through the electric connections shown in Fig. 10.

A source of alternating electric current is indicated at 69 and this is directly connected to the motor 53 and to a voltage rectifying and controlling apparatus indicated at 70. The solenoid 62 of the vibratory feeder is connected to the alternating current by a cam actuated switch 71 and a solenoid operated switch 72 are connected in series in the vibrator circuit. Rectified and regulated current is delivered from the rectifier 70 directly to an adjustable rheostat 73 connected in series with the electromagnet 24. It is contemplated that the rheostat 73 and magnet 24 may be adjusted to exert a pull of between 0 and 4 ounces on the scale beam 1 so that the counterbalance of the beam and therefore the amount of material which must be delivered into a carton to overbalance the beam may be adjusted without mechanically touching or interfering with the beam in any way.

Rectified and regulated current is also fed by the rectifier 70 to the control apparatus for the photoelectric cell 66 and the lamp 68. These controls are well known and are conventionally illustrated at 74. Actuation of the photoelectric cell 66 causes the solenoid 75 to be energized immediately opening the switch 72 and stopping the energization of the vibrator 62. This cuts off the flow of material to the container immediately upon overbalancing movement of the scale pan and beam. Concurrently actuation of the photoelectric cell energizes a solenoid 76 connected mechanically to the one revolution clutch 55 to trip the clutch and start the single revolution cycle of the cam shaft 29. The cams 39, 30 and 51 then function as previously described to elevate and stabilize the scale pan and to raise the conveyor belt 50 to off-feed the filled container. A fourth cam 77 opens the switch 71 to prevent accidental energization of the vibrator during the cam shaft cycle and a fifth cam 78 may open a similar switch 79 in the energizing circuit to the clutch operating solenoid 76. If desired other cams or cam controlled structures can be operated by the cam shaft 29 to regulate and actuate auxiliary mechanisms such as carton controlling gates to regulate the entrance and exit of cartons to and from the scale pan 11 as is described in the above mentioned patent. Upon completion of the single cycle of the cam shaft 29 the structure is returned to its initial starting condition ready to automatically fill a succeeding container.

Reference is now made to the flexible or swingable connection 3 between the scale beam 1 and the upright 2, as is best illustrated in Figs. 5 and 6. The upright 2 has a lateral overhanging upper end 80 which projects across the beam 1. At this point the beam is widened and vertically apertured as at 81 with a central tongue 82 projecting into the aperture. The upper surface of the tongue 82 forms a seat to which the inner end of a horizontal flexible leaf 83 is firmly secured. The outer end of the leaf 83 is firmly clamped to the underside of the projection 80 on the upright by means of a screw 84. The aperture 81 in the beam provides access to the screw 84. The sides of the widened portion of the beam are provided with outwardly facing ears 85 to which vertical flexible leaves 86 are firmly clamped. The leaves 86 project upwardly and are secured firmly to seats 87 provided therefor on the inner side of the projection 80 on the upright 2. The plane of the leaves 86 intersects the plane of the leaf 83 at right angles so that the axis of pivoting or swinging motion of the beam 1 lies along the intersection of the planes of the leaves. The vertical leaves 86 sustain the vertically applied weight of the beam while the horizontal leaf 83 resists horizontal swinging of the beam other than pure pivoting of the beam about the line of intersection of the planes of the leaves.

The details of the connection 10 between the beam 1 and the upper portion of the column 9 are similar to the details of the connection 3 just described. The column 9 is apertured as at 88 (see Fig. 4) to pass the end of the beam and both the beam and the column are widened to provide coacting seats for the vertical leaves 89 positioned on each side of the beam and column. The horizontal leaf 90 is clamped between the undersurface of the beam and the bottom surface of the aperture 88 in the column to provide a swingable connection that is easily movable about the line of intersection of the planes of the leaves 89 and 90.

The swingable connections 15 and 16 at the ends of the lower parallel beam 14 are similar and are most clearly illustrated in Figs. 7 and 8. The outer end of the beam 14 is provided with an outwardly projecting lug 91 having an upwardly facing seat on its upper surface. The opposite portion of the upright 2 is provided with an inwardly projecting lug 92 with a downwardly facing seat on its undersurface. The first leaf 93 has its ends clamped respectively to the lugs 91 and 92 so that the outer end of the parallel beam 14 is actually connected to the upright 2 at a point inwardly from the end of the beam. A cooperative upwardly facing inner seat 94 is formed on the beam 14 substantially inwardly from the lug 91 and approximately aligned wtih the lug 92 on the upright 2. The upright 2 is provided with a cooperative downwardly facing seat disposed outwardly from the lug 94 and a second leaf 95 has its ends clamped to the seat 94 and the upright. The net effect of the connection 16 is that downward pull of the weight of the parallel beam 14 tends to flex the first leaf 93 inwardly about the fixed lug 92 on the upright 2 in a counterclockwise rotating motion as viewed in Fig. 1. The same vertical load of the horizontal beam 14 applied to the second leaf 95 tends to rotate that leaf in a clockwise rotary motion about its fixed connection to the upright 2. The two leaves thus counteract each other and the weight of the parallel beam 14 is supported without flexing or stressing the leaves 93 and 95. At the same time affirmative pivoting motion applied to the horizontal beam 14 as by pressing downwardly on its outer end is freely accommodated by flexing of the leaves 93 and 95.

The connection 15 between the inner end of the parallel beam 14 and the bottom of the column 9 has similar oppositely acting flexible leaf connections 96 and 97 with the leaf 97 connected to the column 9 inwardly from the end of the beam and with the leaf 96 connected to the beam in outwardly spaced relationship to the end of the beam.

The several swingable connections 3, 10, 15 and 16 are frictionless yieldable connections which fully support the scale beam 1 in its neutral position. By adjusting the position of the upright 2 by means of the clamping screws 8 the several flexible connections may be brought to a neutral unstressed condition in the balanced condition of the beam. The action of the filled container in overbalancing the counterbalance weights W and 20 is therefore purely that of balanced weights and does not have to overcome any flexing stress in the several flexible leaves. Therefore the leaves do not pre-load the scale or enter into the weighing action of the scale. At the same time the pivotal connections are entirely free from the effects of dirt or friction and the scale will operate for long periods without getting out of adjustment.

Having thus described the invention, what is claimed to be new and is desired to be secured by Letters Patent is:

1. A carton filling and weighing machine, comprising a vibratory delivery chute, a conveyor belt for advancing cartons underneath said chute, a base, an upright tiltably supported on said base to one side of said belt, a primary scale beam having an intermediate portion suspended from said upright by flexible leaves extending vertically between said upright and said beam and clamped thereto, a horizontal leaf clamped to said upright and said beam and lying in a plane intersecting the flexing portions of said vertically extending leaves, a column extending vertically alongside said beam and spaced from said upright, vertically extending flexible leaves suspending said column from said beam, a second horizontal flexible leaf having its ends connected to said column and said beam, a secondary beam positioned below said scale beam and having its ends connected to said upright and said column by means of pairs of flexible leaves, said pairs of leaves extending horizontally with one end of each leaf of each pair secured to said lower beam at longitudinally spaced points and projecting oppositely to the connecting member whereby the intermediate flexing portions of the leaves tend to bend oppositely under the weight of the lower beam, a counterweight carried by said scale beam outwardly from said upright, a magnetically attractive iron mass carried by said scale beam outwardly from said upright and magnetically insulated therefrom, an electromagnet positioned on said base and cooperative with said iron mass, a scale pan carried on said column above said scale beam and below said belt, a pedestal on said base positioned inwardly of said column, the inner end of said scale beam projecting over said pedestal, a cam shaft rotatably mounted on said pedestal, a shoe disposed between said belt and said pan and slidably supporting said belt, a lever pivotally supported on said pedestal and connected to said shoe, a first cam on said cam shaft cooperative with said lever to elevate said shoe and belt above said pan, a motor having a one revolution clutch drivingly associated therewith, means forming a driving connection between the driven side of said clutch and said shaft, a solenoid mechanically continuously connected to engage said clutch, a source of alternating electric current connected to said motor and to said vibratory delivery chute, current regulating and rectifying apparatus connected to said source, means including a rheostat continuously connecting said electromagnet to the output of said regulating and rectifying apparatus, switching apparatus energized by said rectifying apparatus and arranged to be actuated by movement of said scale beam, means connecting said clutch operating solenoid to said switching apparatus for energization thereby, a cam actuated switch connected in series with said solenoid, a second cam on said shaft positioned to actuate said cam actuated switch, a second cam actuated switch and a solenoid operated switch connected in series with said vibratory delivery chute, a third cam on said shaft positioned to actuate said second cam actuated switch, and a second solenoid positioned to control said solenoid operated switch and electrically connected to said switching apparatus.

2. A carton filling and weighing machine, comprising an electrically connected delivery means, a conveyor belt for advancing cartons underneath said chute, a base, an upright tiltably supported on said base to one side of said belt, a primary scale beam having an intermediate portion suspended from said upright by a flexible leaf extending vertically between said upright and said beam and clamped thereto, a horizontal leaf clamped to said upright and said beam and lying in a plane intersecting the flexing portion of said vertically extending leaf, a column extending vertically alongside said beam and spaced from said upright, a vertically extending flexible leaf suspending said column from said beam, a second horizontal flexible leaf having its ends connected to said column and said beam, a secondary beam spaced from said scale beam and having its ends connected to said upright and said column by means of pairs of flexible leaves, said pairs of leaves extending horizontally with one end of each leaf of each pair secured to said secondary beam at longitudinally spaced points and projecting oppositely to the connecting member whereby the intermediate flexing portions of the leaves tend to bend oppositely under the weight of the secondary beam, a counterweight carried by said scale beam outwardly from said upright, a scale pan carried on said scale beam and below said belt, a cam shaft rotatably mounted on said base inwardly from said pan, a shoe disposed under said belt and adjacent said pan and slidably supporting said belt, a lever pivotally supported on said base and connected to said shoe, a first cam on said cam shaft cooperative with said lever to elevate said shoe and belt above said pan, a downwardly facing stop on said base cooperative with the inner end of said scale beam, a locking lever pivoted on said base and adapted to press said beam against said stop, a second cam on said shaft cooperative with said locking lever, switch means arranged to be actuated by said scale beam, a motor having a one revolution clutch drivingly associated therewith, means forming a driving connection between the driven side of said clutch and said shaft, a solenoid mechanically connected to engage said clutch, a source of electric current connected to said motor and to said delivery means and to said switch means, means connecting said clutch operating solenoid to said scale operated switch means for energization thereby, a cam actuated switch connected in series with said solenoid, a third cam on said shaft positioned to actuate said cam actuated switch, a second cam actuated switch and a solenoid operated switch connected in series with said delivery means, a fourth cam on said shaft positioned to actuate said second cam actuated switch, and a second solenoid positioned to control said solenoid operated switch and electrically connected to said scale operated switch means.

3. A carton filling and weighing machine, comprising a vibratory delivery chute, a conveyor belt for advancing cartons underneath said chute, a base, an upright supported on said base to one side of said belt, a primary scale beam having an intermediate portion suspended from said upright by a flexible leaf extending vertically between said upright and said beam and clamped thereto, a horizontal leaf clamped to said upright and said beam and lying in a plane intersecting the flexing portion of said vertically extending leaf, a column extending vertically alongside said beam and spaced from said upright, a vertically extending flexible leaf suspending said column from said beam, a second horizontal flexible leaf having its ends connected to said column and said beam, a secondary beam spaced from said scale beam and having its ends connected to said upright and said column by means of pairs of flexible leaves, said pairs of leaves extending horizontally with one end of each leaf of each pair secured to said secondary beam at longitudinally spaced points and projecting oppositely to the connecting member whereby the intermediate flexing portions of the leaves tend to bend oppositely under the weight of the secondary beam, a counterweight carried by said scale beam outwardly from said upright, a scale pan carried by said scale beam and below said belt, a cam shaft rotatably mounted on said base, a shoe disposed under said belt and adjacent said pan and slidably supporting said belt, a lever pivotally supported on said base and connected to said shoe, a first cam on said cam shaft cooperative with said lever to elevate said shoe and belt above said pan, means forming a control switch arranged to be actuated by movement of said beam, a motor having a one revolution clutch drivingly associated therewith, means forming a driving connection between the driven side of said clutch and said shaft, a solenoid mechanically connected to engage said clutch, a source of electric current connected to said motor and to said vibratory delivery chute and to said control switch, means connecting said clutch operating solenoid to said control switch for energization thereby, a cam actuated switch connected in series with said solenoid, a second cam on said shaft positioned to actuate said cam actuated switch, a second cam actuated switch and a solenoid operated switch connected in series with said vibratory delivery chute, a third cam on said shaft positioned to actuate said second cam actuated switch, and a second solenoid positioned to control said solenoid operated switch and electrically connected to said control switch.

References Cited in the file of this patent

UNITED STATES PATENTS

| | | |
|---|---|---|
| 340,012 | Springer | Apr. 13, 1886 |
| 849,418 | Nickerson | Apr. 9, 1907 |
| 1,484,358 | Norton | Feb. 19, 1924 |
| 2,144,845 | Kaiesche | Jan. 24, 1939 |
| 2,232,437 | Bushman | Feb. 18, 1941 |
| 2,310,493 | Richard | Feb. 9, 1943 |
| 2,407,513 | Pounds | Sept. 10, 1946 |
| 2,475,684 | Weckerly | July 12, 1949 |
| 2,545,908 | Weckerly | Mar. 20, 1951 |
| 2,584,950 | Weckerly | Feb. 5, 1952 |
| 2,595,035 | Willbrandt | Apr. 29, 1952 |
| 2,645,447 | Clark | July 14, 1953 |
| 2,676,733 | Leber | Apr. 27, 1954 |
| 2,766,001 | Kindseth et al. | Oct. 9, 1956 |